United States Patent [19]

Roth

[11] Patent Number: 4,672,818

[45] Date of Patent: Jun. 16, 1987

[54] THREE-MEMBER PLASTIC ROOFTOP AIR CONDITIONER HOUSING

[75] Inventor: James E. Roth, Desoto, Mo.

[73] Assignee: Intertherm Inc., St. Louis, Mo.

[21] Appl. No.: 904,415

[22] Filed: Sep. 8, 1986

[51] Int. Cl.[4] .............................................. B60H 1/32
[52] U.S. Cl. ...................................... 62/239; 62/295; 62/298; 62/244
[58] Field of Search ................ 62/295, 298, 506, 239, 62/244

[56] References Cited

U.S. PATENT DOCUMENTS

| | | | |
|---|---|---|---|
| 3,973,620 | 8/1976 | Stringer | 62/244 X |
| 4,098,093 | 7/1978 | Czyl | 62/244 X |
| 4,144,719 | 3/1979 | Williams et al. | 62/244 X |
| 4,471,633 | 9/1984 | Tinsler | 62/295 |
| 4,608,834 | 9/1986 | Rummel | 62/244 |

*Primary Examiner*—Henry A. Bennet
*Attorney, Agent, or Firm*—Jerome A. Gross

[57] ABSTRACT

A three-member molded plastic housing for rooftop air conditioners, including base and intermediate members having molded portions which together provide component lower and upper compartment walls and blower scrolls. The third member, an outer shroud, abuts sealedly along a roof ridge of the intermediate member to prevent recirculation within the shroud of condenser blower outlet air. The base member has downwardly molded projections for facilitating positioning the unit over a roof opening and resisting sideward forces.

16 Claims, 6 Drawing Figures

4,672,818

THREE-MEMBER PLASTIC ROOFTOP AIR CONDITIONER HOUSING

FIELD OF THE INVENTION

This invention relates to rooftop air conditioners installed on mobile homes, vans, boats and the like.

DESCRIPTION OF THE PRIOR ART

In air conditioners for installation on roofs of vans, mobile homes and the like, a single-member base may provide a housing foundation for locating air conditioning components. A common alignment for these components is a forward evaporator compartment, followed by an evaporator blower compartment, a motor compartment, and a condenser blower compartment adjacent to the rear of the base.

In such units it is customary to use a number of individual sheet metal pieces fastened onto the base and each other, to space the components from each other and to provide compartment walls and blower scrolls. Separate additional pieces provide for ducting condenser exhaust air to outlet vents and preventing its re-entry into condenser inlet chamber areas. Streamlined outer shrouds serve merely to protect the assembled air conditioning components from outside weather factors. Upon removing the shroud, there is no easy access to those components which may need servicing; such servicing ordinarily requires removal and replacement of numerous parts and can require several hours of a serviceman's time.

A major part of time conventionally required for servicing may be devoted to caulking. This would include not only providing new caulking in those previously caulked joints which are broken when the shroud is removed to service the unit, but also re-caulking joints which have hardened and cracked in service, such as those at junctions of vertical metal walls with a metal base. Such cracked joints may seriously impair the cooling efficiency of the unit. Caulking is also conventionally applied to seal the wiring raceway entrance, into the base of the rooftop unit.

Vans and mobile homes are ordinarily provided with standard-sized rectangular roof vents. On removing the vent covers, the rooftop air conditioners may be installed over these vents, to accommodate both return air and the delivery of conditioned air. Generally, it is necessary to have some securement means to react sideward and fore-and-aft forces, such as bumping, bouncing, cross-winds, etc. This is of particular importance for installations on the roofs of railroad cars.

SUMMARY OF THE INVENTION

The complex assembly and servicing requirements for prior art rooftop air conditioners are minimized by the molded plastic three-piece housing of the present invention. The three members are a base member to which the air conditioning components are mounted in the typical conventional alignment above mentioned, an intermediate member, and a shroud. The base member and intermediate member meet at a substantially central mating plane; together they provide at least lower and upper molded halves for the evaporator and the condenser area compartment walls and scrolls, and in the preferred embodiment, the wiring raceway and its hood. The shroud abuts sealedly along a ridge on the roof of the intermediate member to prevent recirculation within the shroud of outlet air from the condenser blower. The intermediate member is so tailored as to leave the outlet plenum side open when the shroud is removed. This openness, together with a simple access door from the plenum outlet side into the motor compartment, affords easy access for servicing all the components aft of the evaporator compartment.

The undersurface of the base housing member includes a single self-locating rectangular area. This area includes an opening through which the room air is returned upward from the room space; and through this same rectangular area the conditioned air is discharged downward. This area also contains the lower opening of an integrally molded wiring raceway. Molded locator projections, extending downward inwardly of the margin of this rectangular area, facilitate the positioning of the unit onto a roof and provide resistance to sideward displacement during movement of the vehicle.

DESCRIPTION OF THE PREFERRED EMBODIMENT

Figure 1:
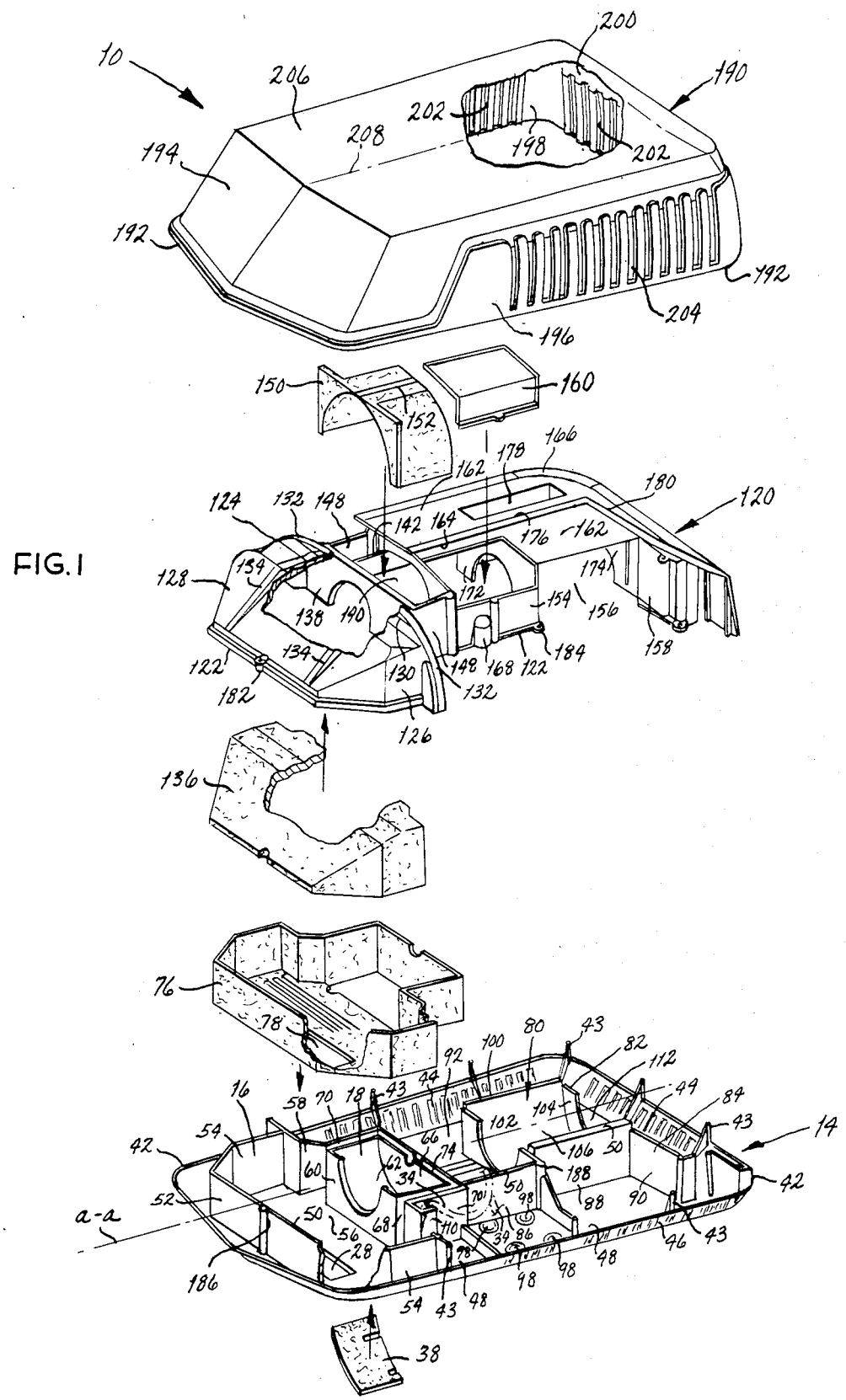
FIG. 1 is an exploded perspective view of a three-member housing for a rooftop air conditioner embodying the present invention.

The molded plastic rooftop air conditioner housing of the present invention, generally designated 10 and shown assembled in FIG. 1, includes three members, a base member generally designated 14, an intermediate member generally designated 120, and an outer shroud member generally designated 190, all hereafter described.

The base member 14 is molded from an engineering grade of structural foam plastic, selected by conventional engineering procedures to be sufficiently strong to support the chosen components of an air conditioning unit. Proceeding from the left in FIGS. 1 and 4, its area includes the lower halves of a forward evaporator compartment 16, an evaporator blower compartment 18, and a condenser area generally designated 80.

Figure 3:
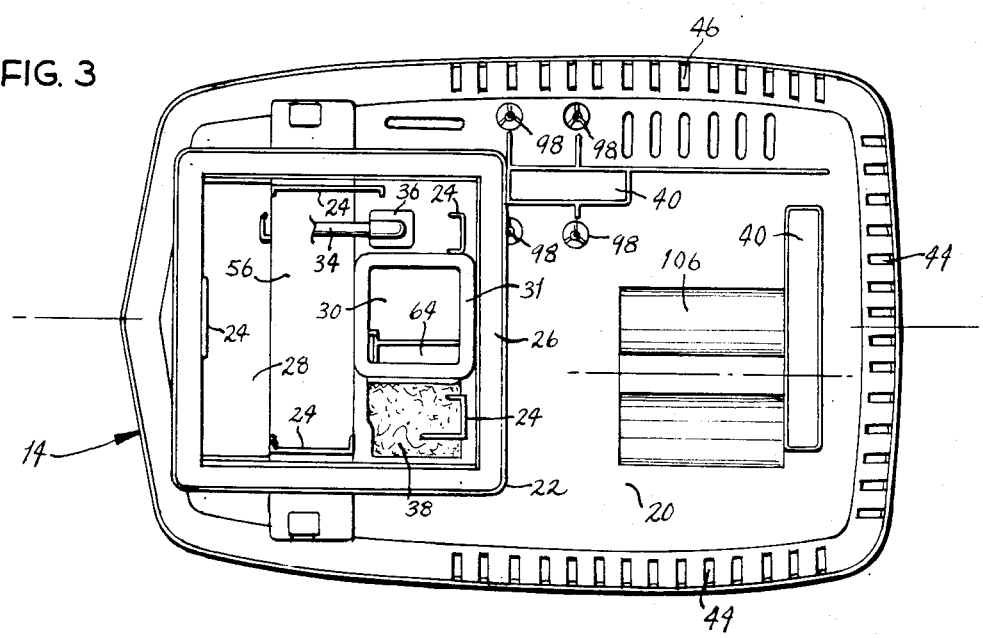
FIG. 3 is a plan view from below corresponding to FIG. 2.

The undersurface of the base member 20, shown in FIG. 3, is provided, near its forward end, with a molded rectangular margin 22 having inwardly thereof a plurality of downwardly molded projections 24. The projections 24 are used to locate the base 14 about an opening, of substantially the same size as the margin 22, in the roof of the vehicle upon which the base member 14 is to be mounted. The margin 22 is lined with a sealing gasket 26.

Within the rectangular margin 22 is a forward rectangular opening 28 through which return air, entering from the room space below the roof, flows upward. Aft of the return air opening 28 is an outlet 30, surrounded by a sealing strip 31, for the downward discharge of conditioned air into the room space. Adjacent to the outlet 30, is a wiring raceway opening 32, seen in FIG.

5, through which the air conditioner wiring 34 extends downward into the room space. Such wiring 34 is retained against the base member 14 by a metal closing clip 36. A rigid foam insulating liner 38 fits against a rounded undersurface portion of an evaporator blower scroll bottom wall 64, later described.

Aft of the rectangular margin 22, the base undersurface 20 may be provided with resilient support pads 40, preferably of the same material as the margin gasket 26. In the embodiment shown in FIG. 3, such pads 40 are located at the rear of the base member 14 and also along one side below where a compressor is to be mounted as hereinafter described.

Further referring to FIG. 2, the base member 14 is provided along its outer margin 42 with air intake and outlet ventilating slots 44, 46 which supplement similar slots of the shroud member 190, as later described.

The top surface of the base member 14 is provided with a series of portions molded upwardly from the bottom wall 48, which for the most part, have upper edges 50 terminating in a common, substantially horizontal plane. These provide lower half compartment walls and lower scrolls for the air conditioner components. As best shown in FIG. 1, these portions include the forward and side lower half-walls 52, 54 of the evaporator compartment 16 which are outwardly adjacent to the return air opening 28. A portion of the bottom wall 48 immediately aft of the return air opening 28 and extending from one side wall 54 to the other provides a transverse bridge 56 for supporting an evaporator coil, not shown.

Aft of the evaporator coil bridge 56 and centered between angled flanking portions 58 is a venturi inlet half-wall 60 leading to the evaporator blower compartment 18. This compartment is further defined by a side and bottom scroll wall 62, which is rounded about a fore-and-aft scroll axis a-a and which contains the conditioned air downward outlet 30, as well as by an aft half-wall 66. The outer side surfaces 68 of the side and aft walls 62, 66 are vertical. Parallel to and spaced outwardly from them are surrounding left and right side wall portions 70 and a rear wall portion 74, which joins the angled flanking portions 58 as shown in FIG. 1.

A molded one-piece foam insulating liner 76, best seen exploded in FIG. 1, lines the inner surfaces of the forward and side walls 52, 54 and the bridge portion 56 of the evaporator compartment 16, as well as the spaces between the vertical outer side surfaces 68 and the parallel surrounding wall portions 70, 74. The insulating liner 76 has a bottom opening 78, corresponding to the return air opening 28; it has no bottom between its vertical walls, which fit in the insulation space about the vertical sides and rear surfaces 68 of the evaporator compartment 32. It is shown installed in FIG. 4.

Aft of the evaporator blower compartment is the condenser area 60. As shown in FIG. 1, it is divided into a narrower outlet plenum side 84 and a wider inlet chamber side 82 by a series of aft-extending walls, including a first separator half-wall 86 and a second separator half-wall 88; it terminates in a lower closure 90 extending to the base margin 42.

Figure 4:
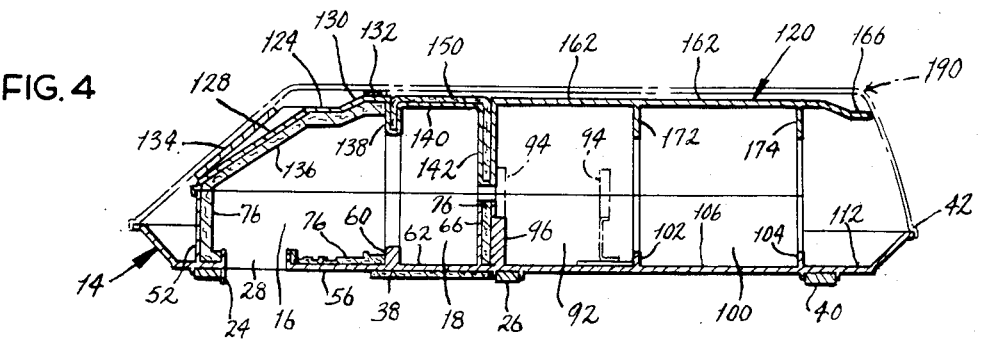
FIG. 4 is a cross section taken along line 4—4 of FIG. 2. The outer shroud is shown installed in phantom lines.

The first separator half-wall 86, seen in FIG. 1, defines, on the inlet chamber side 82, a motor compartment 92. Metal motor mounts 94, shown in phantom lines in FIG. 4, are provided for mounting a motor within this compartment; to stabilize the forward mount, the aft surrounding wall 74 of the evaporator blower compartment 18 is thickened locally at its center, as by the thickened wall 96 shown in FIG. 4. Four lands 98 for mounting a compressor are provided on the outlet plenum side 84 of the separator half-wall 86.

The second separator half-wall 88, likewise seen in FIG. 1, defines the length of a condenser blower compartment 100. On the inlet chamber side 82 of the wall, the compartment 100 has two opposite inlets. The first inlet half-wall 102 extends perpendicular to the second separator half-wall 88, at its juncture with the first separator half-wall 86. Opposite it is a second inlet half-wall 104. Between these two inlet half-walls 102, 104 is the lower half scroll 106 of the condenser blower compartment 100, rounded about the fore-and-aft axis a-a and seen in FIGS. 1 and 6. Opposite to the second separator half-wall 88 is a vertical outer half-wall 108 for the condenser scroll, seen in the cross-sectional view of FIG. 6.

The inlet lower half-walls of the evaporator and condenser blower compartments 60, 102 and 104 have rounded venturi openings. Each of these walls may be thicker than other walls of the base member 14 so as to provide the curved shape needed. To achieve this thickness, without affecting the curing time, these walls may be cored upward.

Also provided on the outlet plenum side 84 of the condenser area 80 and immediately adjacent to the evaporator blower compartment 18 is a vertical wiring raceway 110, molded upwardly from the wiring raceway opening 32. A narrow L-shaped bottom wall 112 space for a condenser coil is provided just inwardly of the right and rear margins of the base member, that is, outward of the juncture of the second condenser inlet 104 with the outer half-wall 108, which supports the scroll wall 106.

Upper half compartment walls and upper scrolls for the chosen air conditioning components are provided by portions molded downwardly from roof portions of the intermediate member 120. For the most part, these downwardly molded portions have lower edges 122 terminating in a substantially horizontal mating plane.

As shown in FIG. 1, the upper half of the evaporator compartment 116 has at its juncture with the evaporator blower compartment 18, a relatively narrow transverse roof portion 124 from which extends downwardly-molded side half-walls 126 and a downwardly sloping forward half-wall 128. The lower edges 122 of these forward and side upper half-walls 128, 126 may be slightly flanged outwardly and downwardly so as to provide a secure, water-resistant fit over the upper edges 50 of the corresponding forward and side half-walls 52, 54 of the base member 14.

Along the rear of the evaporator compartment roof 124, and extending on each side downward to the mating plane, is a transverse ridge 130 covered with a resilient sealing strip 132. Two parallel sealing strips 134 of the same material extend perpendicularly from the transverse ridge 130 to the edge of the forward wall 128. A liner 136 of rigid foam insulation is formed to fit closely against the inner surfaces of the roof 124 and the side and forward walls 126, 128.

Figure 5:
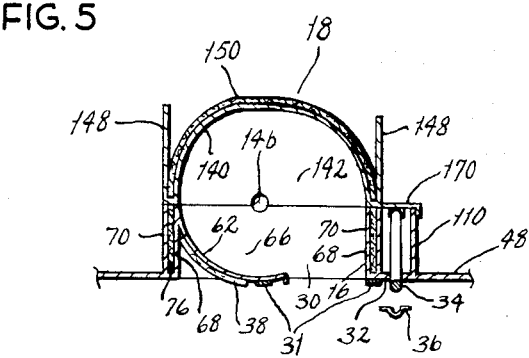
FIG. 5 is a partial cross section taken along line 5—5 of FIG. 2.

Aft of the evaporator compartment roof ridge 130 is the inlet upper half-wall 138 to the evaporator blower compartment 18, formed to mate with the lower inlet half-wall 60 of the base member 14, as shown in the broken away portion of FIG. 1. The compartment 18 is further defined by a side-and-top scroll wall 140 rounded about the same fore-and-aft axis a-a as the side-and-bottom scroll wall 62 of the base member 14, as well as by an upper aft half-wall 142. As seen in FIG. 5, at the juncture of the lower aft half-wall 66 of the base member 14 with this upper aft half-wall 142 is a centrally located rounded opening 146 provided with a seal, not shown, for accommodating the motor shaft.

Mating with the lower evaporator blower compartment outer or surrounding side wall portions 70 of the base member 14, are two vertical outer upper walls 148 extending aft from the upper inlet wall 138 to the upper aft half-wall 142; these are spaced outwardly from the side-and-top scroll wall 140, as seen in FIG. 5. A semi-cylindrical rigid foam insulating liner 150, shown exploded in FIG. 1 and in place in FIGS. 2 and 5, is molded to fit over the outer surface of the upper scroll wall 140, in the space provided between these outer walls 148 and the side-and-top scroll wall 140. The liner 150 is provided with a narrow fore-and-aft sealing strip 152 of resilient material, extending aft from the transverse sealing strip 132, to a top central roof ridge 164 hereafter referred to.

The first upper portion 154 is an aft-extending vertical wall which mates with the first separator half-wall 86 of the base member 14. It has a rectangular opening normally closed by a removable access door 160 to the motor compartment 92. This opening and its access door 160 extends upward from the first upper wall portion 154, then angularly sideward toward the roof ridge 164 to join that portion of the roof 162 over the motor compartment 92. The roof 162 continues across it to the eave 166 which covers the condenser coil space 112 as hereinafter described. The side of the motor compartment 92 adjacent to this coil space is open.

The lower edge 122 of the first upper portion 154 is provided with a wiring passage hood 168 on its outlet plenum side 84 which fits closely over the upper edge 50 of the first separator wall 86. As seen in FIGS. 1 and 2, the hood 168 accommodates and protects wiring 34 to the motor compartment 92, clamping it in a downward-bent loop so that any rain water may drip off harmlessly (see phantom lines in lower illustration of FIG. 1); also making a conventional strain relief fitting unnecessary. A second wiring passage hood 170, best seen in FIGS. 2 and 5, provided on the outlet plenum side 84 adjacent to the evaporator blower compartment 18, similarly protects and restrains the wiring emerging from the vertical wiring raceway 110 of the base member 14.

Figure 6:
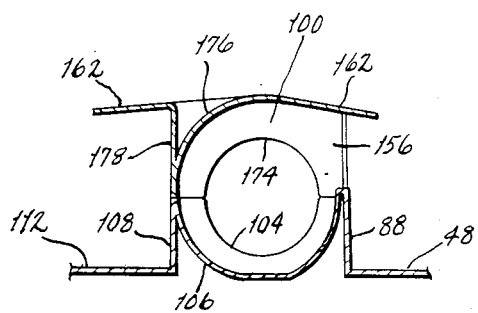
FIG. 6 is a partial cross section taken along line 6—6 of FIG. 2.

As seen in FIGS. 1 and 6, the second upper portion 156 is in effect a window from the condenser blower compartment 100, extending from the upper edge 50 of the base member second separator half-wall 88 to the roof 162. There is provided on the inlet chamber side 82 of the condenser area 80 and molded downward from the roof 162, first and second upper inlet half-walls 172, 174 to mate with the corresponding inlet half-walls 102, 104 of the base member 14.

Between these inlets 172, 174 and opposite the condenser blower compartment window 156 is the upper half scroll portion 176, cored for molding downward from the roof 162 and rounded about the fore-and-aft axis a-a, shown in FIG. 6. A vertical outer wall 178 is molded downwardly from the roof 162 to mate with the lower outer half-wall 108 of the base member 14.

As referred to hereinabove, the roof 162 of the intermediate member 120, best seen in FIGS. 1 and 2, has a topmost ridge 164 running centrally aft from its juncture with the evaporator blower compartment 18 to the second upper inlet 174 and then transversely along the upper closure 158 and down to the mating plane. The ridge 164 is provided with a resilient sealing strip 180 along its full length.

Figure 2:
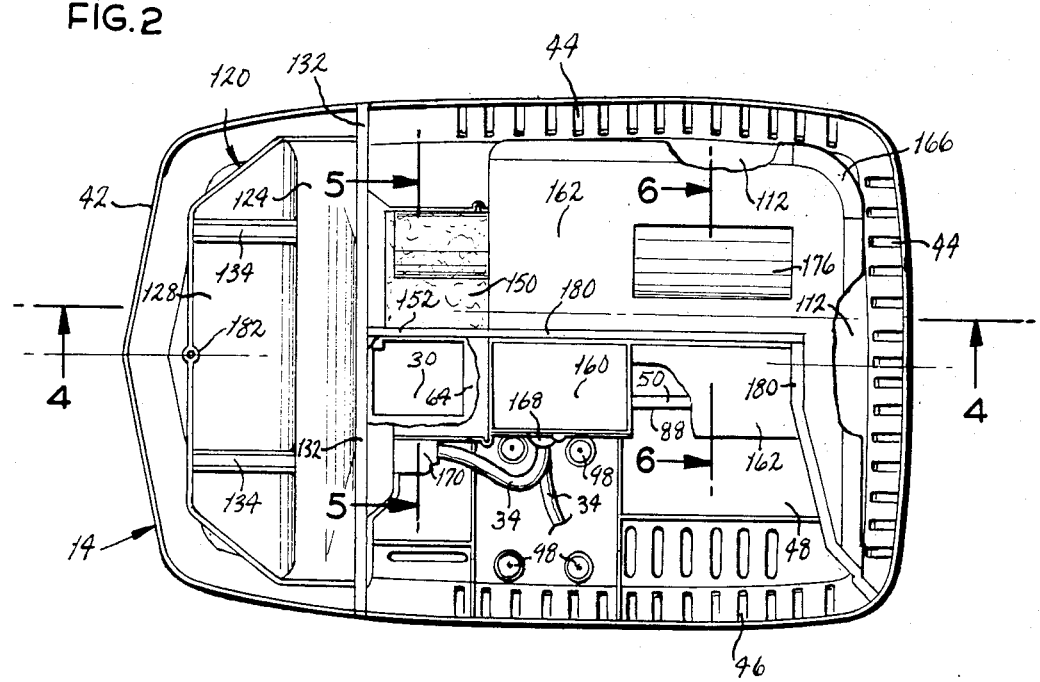
FIG. 2 is an assembled plan view, partly broken away, of the base and intermediate members of the embodiment of FIG. 1.

The roof 162 is further provided with an outwardly extending eave 166, seen in FIGS. 1, 2 and 4, on the inlet chamber side 82. Commencing at the evaporator blower compartment aft wall 142, it extends aft and then inward, over the L-shaped condenser coil space 112, to the upper closure 158. It directs and confines the inflow of air through the condenser coil space 112.

The intermediate member 120 is secured to the base member 14 by a plurality of screws into the foam plastic material of that member. Such screws, not shown, extend through lugs molded onto the upper half compartment walls, which lugs terminate at the horizontal mating plane. The screws engage lands, extending upward from the base member 14 along its upward extending walls, to meet the lugs at the mating plane. Typical are the forward and central lugs 182, 184 shown in the center illustration of FIG. 1, and the forward and central lands 186, 188 shown in its bottom illustration.

The third member of the air conditioner housing 10 is a low-profile shroud 190 of a high-impact, injection molded or thermal formed plastic, shown exploded in FIG. 1 and in place in phantom lines in FIG. 4. It is a thin streamlined shell-like enclosure whose lower edge 192 conforms to the margin 42 of the base member 14. The base member has, inwardly of its margin 42, a plurality of shroud-stabilizing projections 43 extending upward along the inner mold line of the shroud 190, starting with and continuing at intervals aft of the transverse ridge 130. Attachment of the shroud 190 to the base member 14 is by readily removable screws, not shown.

The shroud's forward wall 194 slopes upwardly from its lower edge 192 to fit closely against the forward upper wall of the evaporator compartment 128. Commencing at the edge 192, its right and left side 196, 198 and aft 200 walls begin substantially vertically, and slope to merge into the top wall 206. The right side and aft walls 196, 200 contain a plurality of ventilating slots 202 through which air is drawn in into the condenser coil space 112. The left side wall 196 has ventilating slots 204, symmetrical with those of the right side wall 198, through which air flows that has been discharged through the condenser blower compartment window 156. These slots 202, 204 cooperate with the corresponding slots 44, 46 of the base member 14 to provide maximum air flow. The top wall 206 of the shroud 190 has a crest running aft and then transversely to the side juncture of the top wall 206 with the aft and left side walls 200, 196, shown by the phantom line 208, which is in registration with the separator ridge 164 of the intermediate member 120.

As seen in FIG. 4, when the shroud 190 is placed over the intermediate member 120 and attached to the base member 14 with its undersurface drawn tightly against the sealing strips described, its forward wall 194 fits sealedly against the two parallel sealing strips 134 of the intermediate member forward evaporator compartment wall 128. The transverse ridge 130 with its sealing strip 132 at the aft end of the evaporator compartment 16 fits sealedly against the undersurface of the shroud side and top walls 196, 198, 206 to seal off the evaporator compartment 16 from the condenser area compartments. Hence, behind the transverse ridge 130, the shroud 190 is divided by the fore-and-aft sealing strips 152, 180 into sealed inlet chamber and outlet plenum sides 82, 84, and circulation of air between the two sides is prevented.

The construction of the present invention greatly simplifies the installation of the air conditioner components. The housing 10 replaces the conventional use of a number of individual pieces fastened onto a base and to each other to provide compartment walls and scrolls; the base and intermediate members 14, 120 alone serve these functions. The installation of the assembled rooftop air conditioner is speeded by the locating projections 24 on the undersurface 20 of the base member 14; these not only locate and position the base over the vehicle's vent opening, they also serve as skid members which protect the gasket 26 as the unit is slid into position. Further they prevent sideward displacement of the base 14 during movement of the vehicle.

An outstanding advantage of the present invention is that the time required for opening the unit for servicing, and closing it after servicing, is reduced to a small fraction of that heretofore required. There are no caulked joints to be opened and replaced. Upon removal of the shroud 190 and the access door 160 to the motor compartment 90, all of the air conditioner components aft of the evaporator blower compartment 18 are easily accessed for servicing, including the motor, the controls and their wiring, the compressor, and the condenser coil.

The present substitution of integrally molded and filleted walls and scrolls for separate pieces having caulked joints, also greatly extends the effective useful life of the entire air conditioner. With age, caulked joints become brittle; shock and vibration accompanying use on a moving recreational vehicle will crack such joints. If not recaulked by a skilled serviceman, an otherwise useful unit may readily lose efficiency, say approximately 15%, within a relatively short time. In contrast the integral fillets of the base and intermediate members 14, 120 provide for stream flow of air without any caulking. The foam material itself is an excellent insulator, improving the efficiency of air conditioning.

As modifications may be made in the constructions herein described and illustrated without departing from the scope of the invention, it is intended that all matter contained in the foregoing description or shown in the accompanying drawings shall be interpreted as illustrative rather than limiting.

I claim:

1. A three-member molded plastic housing for a rooftop air conditioning unit, comprising
   (I) a molded plastic base member including base opening means to receive return air to such unit, and to discharge conditioned air therefrom, and to receive wiring from beneath such roof, and
   means to provide lower half-walls for an evaporator compartment, an evaporator blower compartment, and a condenser compartment separator dividing its area into an inlet chamber side and an outlet plenum side, and means to provide lower half-walls for a motor compartment and a condenser blower compartment on said inlet chamber side,
   (II) a molded plastic intermediate member having means to provide upper half-walls completing those lower half-wall elements recited in (I) hereinabove, and including means to provide a condenser blower compartment window across the condenser compartment separator, further having
   means to provide a roof for the evaporator and condenser compartments and a ridge extending aft of said evaporator compartment roof to an outer margin of said base member, in combination with
   (III) an upper shroud member having means to communicate inlet air to such inlet chamber side and to permit exit of air from the outlet plenum side of such condenser area compartment, together with
   sealing means, along said intermediate member ridge and between it and the undersurface of said shroud, to prevent recirculation within said shroud of air from such plenum side to such inlet side.

2. A three member molded plastic housing for supporting and separating the components of a rooftop air conditioning unit and ducting airflows therethrough, generally having in plan form a forward evaporator compartment, then an evaporator blower compartment and then a condenser area, divided longitudinally into an inlet chamber side and an outlet plenum side, said housing comprising
   (I) a base member having a bottom wall including a return air opening, a conditioned air outlet, and a wiring raceway opening,
   portions molded upwardly from said bottom wall to define
   a lower evaporator compartment half, said upwardly molded portions including vertical forward and side halfwalls, the said return air opening being inwardly adjacent to said forward half-wall, and further to define aft of said evaporator compartment
   a lower evaporator blower compartment having an inlet lower half-wall leading aft from such evaporator compartment,
   a side-and-bottom scroll wall rounded about a fore-and-aft axis, an aft lower half-wall, and a scroll bottom containing said conditioned air outlet,
   said upwardly molded portions dividing such condenser area longitudinally by a first separator half-wall and a second separator half-wall terminating in a lower closure to the margin of said base member,
   said first separator half-wall defining on such inlet chamber side, a motor compartment extending aft of the evaporator blower compartment, said second separator half-wall defining the length of a condenser blower compartment, therebeing upwardly molded, at its forward juncture with the motor compartment, an inlet lower half-wall, and an opposite half-wall at the end of said second separator half-wall, said condenser blower compartment having, between said opposite half-walls, lower half scroll portions, rounded about the same axis as that of the evaporator blower scroll portions and molded upward from said base member and spaced inwardly from the adjacent side margin of the base member, whereby such spacing provides room for mounting an upright condenser coil,
   there being means provided on said base member bottom wall, on the outlet plenum side, for mounting a compressor,
   said lower base member further having, forwardly on the outlet plenum side of the condenser area, an upwardly molded vertical wiring raceway, leading from said bottom wall raceway opening, said invention further comprising
   (II) an intermediate member having a roof portion, and having portions molded downwardly therefrom to define an upper evaporator compartment half, said downwardly molded portions including forward and side walls adapted to mate with the evaporator compartment walls of the base member, said downwardly molded portions further defining, aft of such evaporator compartment, an upper evaporator blower compartment, having an inlet upper half-wall, a rounded side-and-top scroll wall, and an upper aft half-wall, the roof having aft thereof, in such condenser area, a topmost separator ridge and, aligned with the respective separator lower half-walls of the base member first and second upper portions terminating aft in an upper closure mating with the lower closure of the base member, said first upper portion including an access door to such motor compartment, said second upper portion being a windowed condenser blower scroll outlet between an inlet upper half-wall and an opposite upper half-wall, there being between said opposite half-walls, an upper half rounded scroll portion, all being so downwardly molded, in combination with (III) an upper shroud member having outer lower edges adapted for securement to the perimeter of said base member, and having an outer wall portion including air intake grilles on the inlet chamber side of such condenser area and outlet grilles on its outlet plenum side, said upper shroud member further having an upper wall portion whose inner surface is adapted to fit closely adjacent to said condenser area separator ridge of the intermediate member, together with means to seal against flow of air across and forwardly of said condenser area separator ridge, whereby to prevent recirculation within said shroud member of air from the outlet plenum of such condenser area to the inlet chamber thereof.

3. A molded plastic housing as defined in claim 2, wherein the said intermediate member roof has an eave extending sidewardly outward from such motor and condenser blower compartments and above such condenser coil space of the base member, whereby to direct and confine the inflow of air through a condenser coil occupying such space.

4. A molded plastic housing as defined in claim 2, wherein the aft opposite upper and lower half-walls of such condenser blower compartment are configured to together provide a second inlet to said compartment, and are spaced inwardly from the rear margin of said base member, whereby to extend such condenser coil space angularly to the aft side of said second inlet to terminate at the said closure means, the said shroud inlet grilles including grilles at the aft side of the shroud along such angularly extended space.

5. A molded plastic housing as defined in claim 2, wherein the evaporator compartment side walls, bottom and roof are provided, on their inner sides, with molded insulating material, there being an opening in said insulating material, on the inside of the evaporator compartment bottom, corresponding to said return air opening for the passage of air therethrough.

6. A molded plastic housing as defined in claim 2, wherein the side and aft lower half-walls of the evaporator blower compartment have outer side vertical surfaces, the base member further having upwardly formed wall portions parallel to and spaced outwardly from said vertical surfaces, there being insulating material provided in the spaces therebetween and also on the outer sides of the rounded scroll walls of said compartment.

7. A molded plastic housing as defined in claim 2, wherein the said upwardly molded half-walls of said base member terminate in a common substantially horizontal plane.

8. A molded plastic housing as defined in claim 2, wherein the evaporator blower compartment aft wall is provided, at the juncture of the upper and lower aft half-walls with such fore-and-aft axis, with means for sealedly accommodating a rotating shaft.

9. A molded plastic housing as defined in claim 2, wherein the intermediate member has, along the lower edge of downwardly formed portions demarking the plenum, wiring passage hoods extending into the plenum, whereby to accommodate wiring and protect it from downflow of water.

10. A molded plastic housing as defined in claim 2, wherein said base member bottom wall undersurface has a rectangular margin circumscribing the said return air opening, the said conditioned air outlet and the said wiring raceway opening, there being molded means, inwardly adjacent to each of the four sides of said rectangular margin, to project downward from said bottom wall undersurface and to resist sideward forces, whereby to facilitate locating said base member on a rooftop having a rectangular opening of corresponding shape, and to resist sideward displacement from such location.

11. A molded plastic housing as defined in claim 2, wherein said base member bottom wall has, along its margin, intake grilles on the inlet chamber side of the condenser area and outlet grilles on its outlet plenum side in alignment with said grilles of said shroud member.

12. A molded plastic base member for supporting and separating the components of a rooftop air conditioning unit, said base member comprising a substantially horizontal base wall having along its undersurface a rectangular margin circumscribing a return air opening, a conditioned air outlet, and a wiring raceway opening, (A) there being portions molded upwardly from said base wall to define a lower evaporator compartment, said upwardly molded portions including vertical forward-and-side wall portions, the said return air opening being inwardly adjacent to said forward wall portion, a lower evaporator blower compartment having an inlet lower wall portion leading aft from such evaporator compartment, a side-and-bottom scroll wall rounded about a fore-and-aft axis, an aft lower wall portion, and a scroll bottom containing said conditioned air outlet, said upwardly molded portions further defining a condenser area longitudinally divided into an inlet chamber side and an outlet plenum side, said molded portions including a first separator wall portion, and a second separator wall portion terminating in a lower closure to the margin of said base member, said molded portions further including lower condenser blower compartment walls including a condenser blower scroll wall rounded about the aforesaid fore-and-aft axis, an inlet lower wall portion extending perpendicular to said second separator wall portion at its juncture with said first separator wall portion, and a lower wall portion opposite to said inlet wall portion extending parallel thereto from the juncture of said second separator portion with said lower closure, said rounded blower scroll wall portion being spaced inwardly from the adjacent side margin of the base member, whereby such spacing provides room for mounting an upright condenser coil, there being provided on said base member wall, on the outlet plenum side, means for mounting a compressor, said base member having, forwardly on the outlet plenum side, an upwardly molded vertical wiring raceway leading from said base wall raceway opening, (B) the base member further having molded means inwardly adjacent to each of the four sides of said rectangular margin, to project downward from said base undersurface and to resist sideward forces, whereby to facilitate locating said base member on a rooftop having a rectangular opening of corresponding shape, and to resist sideward displacement from such location.

13. A base member as defined in claim 12, wherein the side and aft wall portions of the evaporator blower compartment have outer side vertical surfaces, the base member further having upwardly formed wall portions parallel to and spaced outwardly from said vertical surfaces, there being insulating material provided in the spaces therebetween, there being further provided in the aforesaid lower evaporator compartment, an insulating liner having a bottom opening corresponding to said return air opening for the passage of air therethrough.

14. An insulated molded plastic base member for a rooftop air conditioning unit, said base member comprising a substantially horizontal base wall having along its undersurface a rectangular margin circumscribing a return air opening, and a conditioned air outlet, there being portions molded upwardly from said base wall to define a lower evaporator compartment, said upwardly molded portions including vertical forward and side wall portions, the said return air opening being inwardly adjacent to said forward wall portion, a lower evaporator blower compartment having an inlet lower wall portion leading aft from such evaporator compartment, an interior side-and-bottom scroll wall rounded about a fore-and-aft axis, an aft lower wall portion and a scroll bottom containing said conditioned air outlet, the outer surface of said scroll side and aft wall portions being vertical, the base member having upwardly formed vertical wall portions parallel to and spaced outwardly from said vertical side and aft wall surfaces, there being insulating material provided in the spaces therebetween, there being further provided in the aforesaid lower evaporator compartment an insulating liner having a bottom opening corresponding to the said return air opening for the passage of air therethrough.

15. A molded plastic base member as defined in claim 14, wherein the said rectangular margin further circumscribes a wiring raceway opening from which extends an upwardly molded vertical wiring raceway, outwardly adjacent to one of the said parallel outwardly-spaced side wall portions.

16. A molded plastic base member as defined in claim 14, there being molded means inwardly adjacent to each of the four sides of said rectangular margin to project downward from said base undersurface and to resist sideward forces, whereby to facilitate locating said base member on a rooftop having a rectangular opening of corresponding shape, and to resist sideward displacement from such location.

* * * * *